(12) United States Patent
Rockett et al.

(10) Patent No.: US 9,767,697 B2
(45) Date of Patent: *Sep. 19, 2017

(54) AUTOMATED ENROLLMENT AND ACTIVATION OF TELEMATICS EQUIPPED VEHICLES

(75) Inventors: David W. Rockett, Lake Orion, MI (US); Frederick J. Beiermeister, Farmington Hills, MI (US); Gary M. Gumushian, Bloomfield Hills, MI (US)

(73) Assignee: General Motors LLC, Detroit, MI (US)

( * ) Notice: Subject to any disclaimer, the term of this patent is extended or adjusted under 35 U.S.C. 154(b) by 2855 days.

This patent is subject to a terminal disclaimer.

(21) Appl. No.: 11/764,552

(22) Filed: Jun. 18, 2007

(65) Prior Publication Data
US 2007/0244628 A1    Oct. 18, 2007

Related U.S. Application Data

(62) Division of application No. 10/631,357, filed on Jul. 31, 2003, now abandoned.

(51) Int. Cl.
*G06F 7/00* (2006.01)
*G08G 1/00* (2006.01)
*H04L 29/08* (2006.01)

(52) U.S. Cl.
CPC .............. *G08G 1/205* (2013.01); *H04L 67/12* (2013.01); *H04L 67/125* (2013.01); *H04L 69/329* (2013.01)

(58) Field of Classification Search
CPC .......... G06F 8/00; G01C 21/00; G06Q 30/00; G06Q 99/00
USPC .................................................. 705/1.1, 500
See application file for complete search history.

(56) References Cited

U.S. PATENT DOCUMENTS

| | | | |
|---|---|---|---|
| 6,282,464 B1 * | 8/2001 | Obradovich | 701/1 |
| 6,282,491 B1 * | 8/2001 | Bochmann | G01C 21/26 342/357.4 |
| 6,490,445 B1 * | 12/2002 | Holmes | H04W 8/265 455/411 |
| 6,882,905 B2 * | 4/2005 | Hall et al. | 701/1 |
| 7,224,935 B2 * | 5/2007 | Messina | G08G 1/20 455/12.1 |
| 2002/0174360 A1 * | 11/2002 | Ikeda | 713/200 |
| 2003/0061079 A1 * | 3/2003 | Noghero | G01C 21/26 705/5 |
| 2003/0177133 A1 * | 9/2003 | Hikida | 707/100 |

* cited by examiner

*Primary Examiner* — Kira Nguyen
(74) *Attorney, Agent, or Firm* — Christopher DeVries; Reising Ethington P.C.

(57) ABSTRACT

A method for automated enrollment and activation of a mobile telematics system comprising receiving a customer data record of a customer at a communication services database, determining a command signal based on the customer data record, sending the command signal to a telematics unit of a vehicle, enrolling the customer in a telematics-unit access system based on the command signal and activating the telematics unit of the telematics-unit access system based on the command signal.

16 Claims, 7 Drawing Sheets

AUTOMATED ENROLLMENT AND ACTIVATION OF TELEMATICS EQUIPPED VEHICLES

CROSS REFERENCE TO RELATED APPLICATION

This application is a divisional of U.S. application Ser. No. 10/631,357 filed Jul. 31, 2003.

FIELD OF THE INVENTION

This invention relates generally to automated enrollment and activation of mobile telematics systems. In particular, the invention relates to a computer usable medium and means for automatic enrollment in a telematics system and activation of system service.

BACKGROUND OF THE INVENTION

Information and interactive services available to mobile vehicles are increasing due to the demand of mobile vehicle operators for services such as navigation assistance, directory assistance, vehicle maintenance assistance, roadside assistance, information services assistance and emergency assistance. Requests for many of these services occur when a vehicle is outside of a home region, for example, during personal travel or business trips to neighboring or distant cities. In addition, the number of vehicles outfitted with suitable equipment to request and receive service information is growing. Projections are that by 2006 a majority of new American cars will be installed with some type of telematics unit to provide wireless communication and location-based services. These services are accessible through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

For example, traffic and driving directions are accessible through a voice portal that uses incoming number identification to generate location information based on the area code or prefix of the phone number, or to access location information stored in a user's profile associated with the phone number. In some cases users are prompted to enter more details through a voice interface. Other examples are web and wireless portals that offer location-based services such as maps and driving directions where the user enters both start and end addresses. Some of these services will have a voice interface.

This system applies to vehicles, which leave a factory with a telematics system described above already installed. Once the vehicle is sold by a dealership the customer is enrolled in the telematics system database and the system is activated. There are several opportunities for initiation of the telematics system to occur. In one scenario, initiation of a telematics service occurs upon purchase of the vehicle prior to leaving the dealership. Then the dealer calls a telematics call center using the telematics system to provide data on the subscriber to a real communication service advisor at the telematics call center. The dealer must also provide details on the telematics services desired by the subscriber to the communication service advisor in a time consuming interaction.

In a second scenario, initiation of a telematics service occurs after the vehicle leaves the dealership. Then the customer calls a telematics call center using the telematics system to provide data on the subscriber to a real communication service advisor at the telematics call center. The customer must also tell the communication service advisor which telematics services they want in their subscription package during a time consuming interaction with the communication service advisor.

It is desirable, therefore, to provide a system and method to reduce the time required to enroll a new subscriber in a telematic system that overcomes these and other disadvantages.

SUMMARY OF THE INVENTION

One aspect of the present invention provides a method for automated enrollment and activation of a mobile telematics system comprising receiving a customer data record of a customer at a communication services database, determining a command signal based on the customer data record, sending the command signal to a telematics unit of a vehicle, enrolling the customer in a telematics-unit access system based on the command signal and activating the telematics unit of the telematics-unit access system based on the command signal.

A second aspect of the present invention provides a computer usable medium storing a computer program comprising computer readable code for receiving a customer data record of a customer at a communication services database, computer readable code for determining a command signal based on the customer data record, computer readable code for sending the command signal to a telematics unit of a vehicle, computer readable code for enrolling the customer in a telematics-unit access system based on the command signal and computer readable code for activating the telematics unit of the telematics-unit access system based setup based on the command signal.

A third aspect of the present invention provides telematics-unit access system comprising means for receiving a customer data record at a communication services database, means for determining a command signal based on the customer data record, means for sending the command signal to a telematics unit of a vehicle, means for enrolling the customer in a telematics-unit access system based on the command signal and means for activating the telematics unit of the telematics-unit access system based on the command signal.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
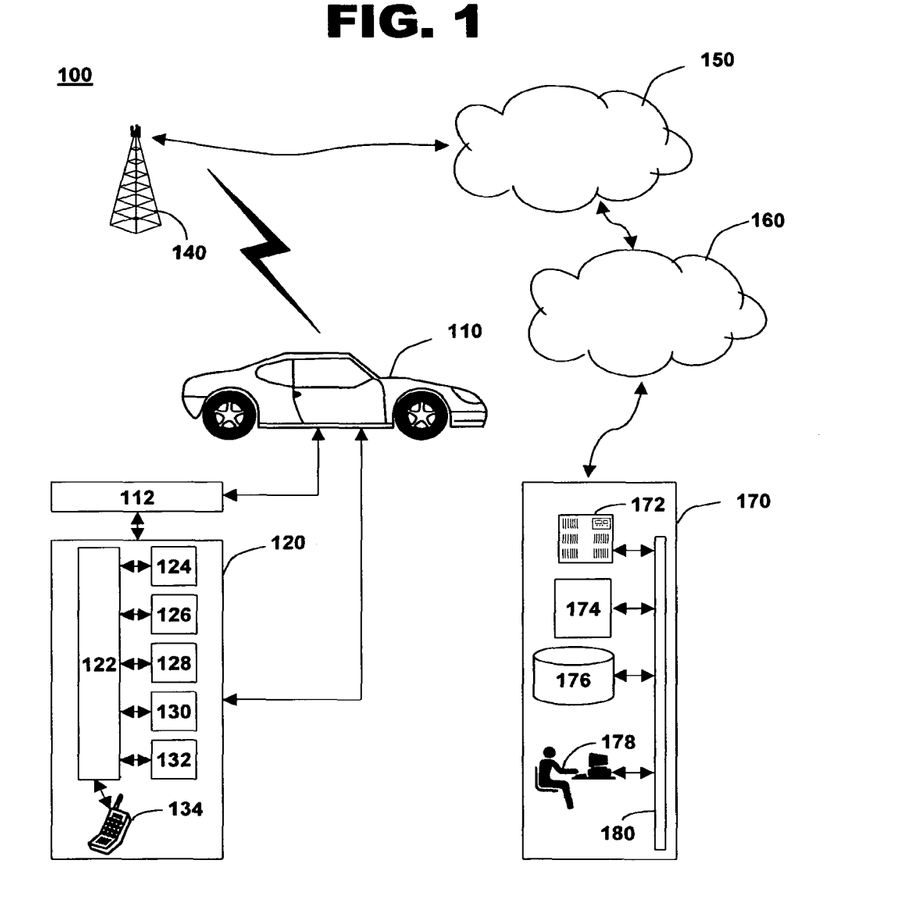
FIG. 1 is a schematic diagram of a telematics-unit access system for a vehicle in accordance with the present invention.

FIG. 1 is a schematic diagram of a system for providing access to a telematics unit in a mobile vehicle. Telematics-unit access system 100 includes a mobile vehicle 110, a telematics unit 120, one or more wireless carrier systems 140, one or more communication networks 150, one or more land networks 160, and one or more call centers 170. A telematics unit 120 provides the telecommunications link in one embodiment of this present invention. Mobile vehicle 110 includes vehicles such as cars, vans or trucks equipped with suitable hardware and software for transmitting and receiving voice and data communications.

In some embodiments of this invention, telematics unit 120 includes a digital signal processor (DSP) 122 connected to a wireless modem 124, a global positioning system (GPS) receiver or GPS unit 126, a memory 128, a microphone 130, one or more speakers 132, and an embedded or in-vehicle phone 134. DSP 122 is also referred to as a microcontroller, controller, host processor, or vehicle communications processor. Functions provided by GPS unit 126 include longitude and latitude coordinates of the vehicle. The in-vehicle phone 134 is selected from the group including, but not limited to, an analog, digital, dual-mode, dual-band, multi-mode or multi-band cellular phone.

Telematics unit 120 has capability to store phone numbers and messages in memory 128. Telematics unit 120 has capability to set or reset calling-state indicators and to enable or disable various cellular-phone and telematics-unit functions when directed by microcode running on DSP 122. Telematics unit 120 has capability to send and receive over-the-air messages using, for example, a pseudo-standard air-interface function or other proprietary and non-proprietary communication links.

DSP 122 executes various computer programs and computer program code that control programming and operational modes of electronic and mechanical systems within telematics unit 120. DSP 122 has capability to control communications between telematics unit 120, wireless carrier system 140, and call center 170. In some embodiments of this invention, voice-recognition application is installed in DSP 122 to translate human voice input through microphone 130 to digital signals. The capability to, for example, program in-vehicle phone 134 will be controlled with verbal commands that are translated by voice-recognition software executed by DSP 122. Alternatively, in other embodiments of this invention, pushing buttons on an interface of telematics unit 120 or in-vehicle phone 134 will be used to indicate a termination code or a recipient code. The interface to telematics unit 120 includes one or more buttons on the telematics unit, radio console, or associated keyboard or keypad. In other embodiments, the interface to telematics unit 120 includes other forms of preference and data entry including touch-screens, wired or wireless keypad remotes, or other wirelessly connected devices such as Bluetooth-enabled devices.

DSP 122 controls, generates and accepts digital signals transmitted between telematics unit 120 and a vehicle communication bus 112 that is connected to various electronic modules and sensors in mobile vehicle 110. Some functional capabilities of DSP 122 include activation of various programming and operation modes, as well as provision for data transfers. Additional functional capabilities of DSP 122 include translation of signals into voice messages to be sent out through speaker 132. One of the generated voice messages might, for example, include a phone number prompt given when a user has requested and entered a programming mode of in-vehicle phone 134.

Mobile vehicle 110 via telematics unit 120 has the capability to send and receive radio transmissions from wireless carrier system 140. Wireless carrier system 140 includes any suitable system for transmitting a signal from mobile vehicle 110 to communication network 150.

Communication network 150 includes services provided by one or more mobile telephone switching offices and wireless networks. Communication network 150 includes connect wireless carrier system 140 to land network 160. Communication network 150 includes any suitable system or collection of systems for connecting wireless carrier system 140 to mobile vehicle 110 and land network 160. Communication network 150 has capability to send and receive short messages according to established protocols such as IS-637 standards for short message service (SMS), IS-136 air-interface standards for SMS, and GSM 03.40 and 09.02 standards. Similar to paging, an SMS communication might, for example, be posted along with an intended recipient, such as a communication device in mobile vehicle 110.

Land network 160 is a public-switched telephone network. Land network 160 includes Internet protocol (IP) networks. Land network 160 also includes wired networks, optical networks, fiber networks, other wireless networks, or any combination thereof. Land network 160 is connected to one or more landline telephones. In some embodiments of the invention, land network 160 and communication networks 150 are connected to call center 170. In some embodiments, communication network 150 and land network 160 connect wireless carrier system 140 to a communication node or call center 170.

In one embodiment of the invention, call center 170 includes one or more voice and data switches 172, one or more communication services managers 174, one or more communication services databases 176, one or more communication services advisors 178, and one or more bus systems 180.

Call center 170 is a location with capability to receive many calls to be serviced at the same time and to send many calls at the same time. In some embodiments of this invention, the call center is a telematics call center, prescribing communications to and from telematics unit 120 in mobile vehicle 110. In alternate embodiments, the call center is a voice call center, providing verbal communications between an advisor in the call center and a subscriber in a mobile vehicle. In some embodiments of the present invention, the call center contains each of these functions. In some embodiments of the present invention, call center 170 is capable of receiving a telematics unit access requests from a telematics user via wireless carrier system 140, communication network 150, over land network 160, or any combination thereof.

In some embodiments of the present invention, call center 170 contains one or more voice and data switches 172, where the switches 172 are connected to land network 160 and the switches 172 transmit voice or data transmissions from call center 170. In alternate embodiments, switch 172 receives voice or data transmissions from telematics unit 120 in mobile vehicle 110 through wireless carrier system 140, communication network 150, and land network 160. In other embodiments, switch 172 receives from or sends to one or more communication services managers 174 data transmissions via one or more bus systems 180. In some embodiments, communication services manager 174 is comprised of suitable hardware and software capable of providing requested communication services to telematics unit 120 in mobile vehicle 110. In some embodiments, communication services manager 174 sends to or receives from one or more communication services databases 176 data transmissions via bus system 180. In some embodiments, communication services manager 174 sends to or receives from one or more communication services advisors 178 data transmissions via bus system 180. In some embodiments, communication services database 176 sends to or receives from communication services advisor 178 data transmissions via bus system 180. In some embodiments, communication services advisor 178 receives from or sends to switch 172 voice or data transmissions.

Communication services manager 174 provides one or more of a variety of services, including enrollment services, navigation assistance, vehicle personalization, vehicle data upload, vehicle data download, replenish subscriber minutes, unlock/lock vehicle, flash lights, honk horn, perform diagnostic functions and perform vehicle tracking functions. Communication services manager 174 has the capability to transmit data to telematics unit 120 in mobile vehicle 110 through wireless carrier system 140, communication network 150, land network 160, voice and data switch 172, and bus system 180. In some embodiments, communication services manager 174 stores or retrieves data and information from communication services database 176. In some embodiments, communication services manager 174 provides requested information to communication services advisor 178. In some embodiments, communication services manager 174, along with the other components of call center 170, sends over-the-air messages to enable or disable telematics unit 120 through land network 160, communication network 150, and wireless carrier system 140.

In some embodiments, communication services advisor 178 is a real advisor or a virtual advisor. A real advisor is a human being in verbal communication with a user or subscriber in mobile vehicle 110 via telematics unit 120. In some embodiments, the virtual advisor is a synthesized voice interface responding to requests from telematics unit 120 in mobile vehicle 110. This virtual advisor includes one or more recorded messages.

Communication services advisor 178 provides services to telematics unit 120 in mobile vehicle 110. Possible services provided by communication services advisor 178 are enrollment services, navigation assistance, real-time traffic advisories, directory assistance, roadside assistance, business or residential assistance, information services assistance, emergency assistance, and communications assistance. In some embodiments, communication services advisor 178 communicates with telematics unit 120 in mobile vehicle 110 through wireless carrier system 140, communication network 150, and land network 160 using voice transmissions, or through communication services manager 174 and switch 172 using data transmissions.

In one embodiment, mobile vehicle 110 initiates a service request to call center 170 by sending a voice or digital-signal command to telematics unit 120 which in turn, sends an instructional signal or a voice call through wireless modem 124, in-vehicle phone 134, wireless carrier system 140, communication network 150, and land network 160 to call center 170. In some embodiments, call center 170 determines mobile identification numbers and telematics unit identifiers associated with a telematics unit access request, compare mobile identification numbers and telematics unit identifiers with a database of identifier records, and send calling-state messages to the telematics unit based on the request and identification numbers.

In some embodiments, software including a program to provide access to the telematics unit resides, at least in part, at the call center. Such a program includes computer program code to receive a telematics unit access request, to determine a mobile identification number, and to determine a telematics unit identifier. The program compares the mobile identification number and the telematics unit identifier with a database of identifier records, and sends a calling-state message based on the telematics unit access request. In some embodiments, the software is provided on any suitable computer usable medium such as a compact disc, digital video disc, magnetic media, semiconductor memory, nonvolatile or permanent memory. Computer program code, which resides on any suitable computer usable medium such as magnetic, optical, or semiconductor media, has the capability to store the updated mobile identification number and calling-state indicator in the telematics unit, and enable the cellular phone. Computer program code to set the calling-state indicator to a predefined billing state and to disable the embedded cellular phone, in some embodiments, resides, in part, within the telematics unit and is executed by a processing unit within the telematics unit.

Figure 2:
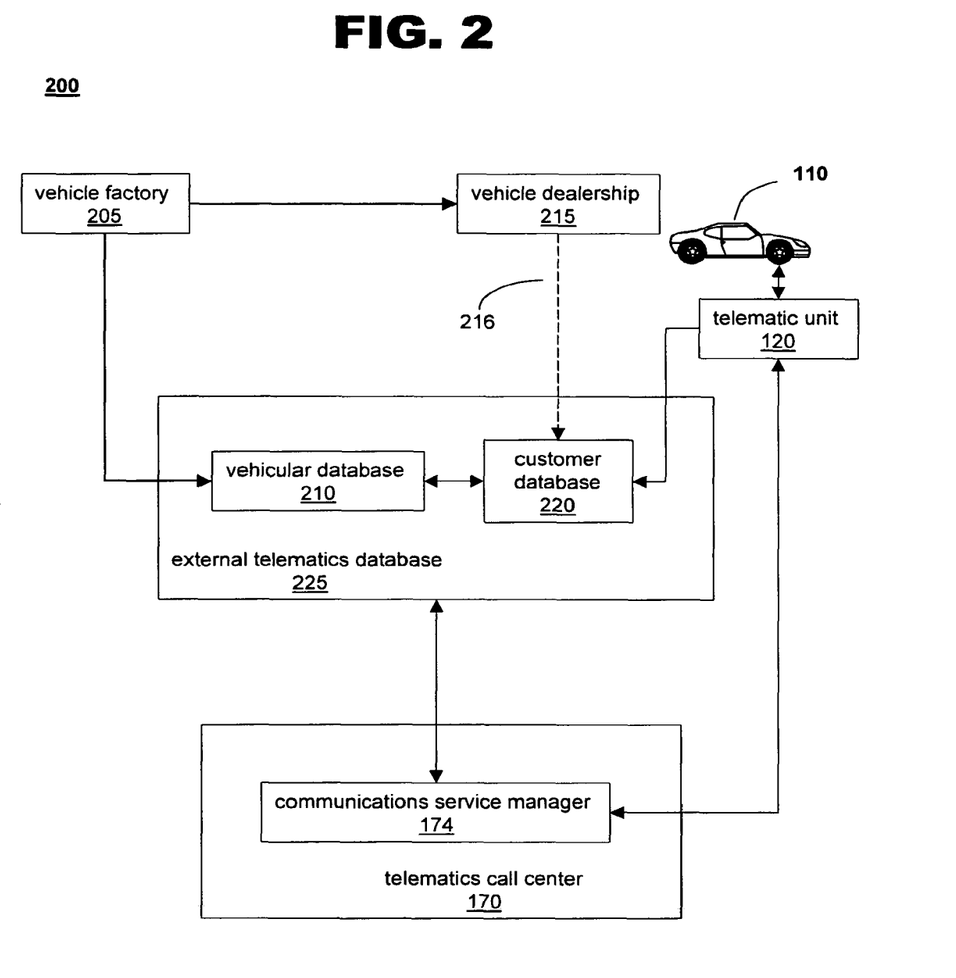
FIG. 2 is a schematic block diagram of a system for providing data to a telematics-unit access system, in accordance with a first embodiment of the present invention.

FIG. 2 is an illustration in block diagram of the flow of data 200 required to enroll a subscriber and activate a telematics-unit access system 100 according to the present invention. The vehicle factory 205 manufactures a vehicle 110 with a telematic unit 120. The vehicle 110 is shipped to vehicle dealership 215 where it is offered for sale to potential customers (not shown). When the factory 205 ships the vehicle 110 to the vehicle dealership 215, it also transmits data about the vehicle to a vehicular database 210, which is in the external telematics database 225. The vehicular database contains data on a plurality of vehicles with telematic units 120 installed. The vehicle data is transferred via one or more wireless carrier systems 140, one or more communication networks 150 and one or more land networks 160. The data sent to vehicular database 210 includes, but is not limited to, the vehicle identification number, the electronic serial number of the cell phone 134, and the name and location of the vehicle dealership 215 to which the vehicle 110 was shipped. The vehicular database 210 is a portion of an external telematics database 225.

When a customer purchases a vehicle 110 with an installed telematics unit 120, the customer is enrolled as a subscriber in the telematics-unit access system 100 and the subscriber account is activated with the features desired by the customer.

The word customer and subscriber are used interchangeably within this document to describe the person who buys the vehicle and subscribes to the telematics-unit access system 100. The dealer selling the vehicle 110 to the customer, as part of the sales, enters data about the customer in a dealership database (not shown). Some of this customer data is automatically sent to the customer database 220, as illustrated by the dashed arrow 216 connecting the vehicle dealership 215 and the customer database 220. The customer data is sent to the customer database 220 in a format, such as, for example, a customer delivery report. The customer delivery report may include, but is not limited to the customer name, address, phone number, selling dealer, the desired features in the telematics-unit access system 100 and vehicle identification number of the purchased vehicle 110. The customer data may be transmitted to the customer database 220 at the end of the day or periodically during the day or the week. The customer base data transmission is completed via one or more wireless carrier systems 140, one or more communication networks 150 and one or more land networks 160. The customer is enrolled as a subscriber in the telematics-unit access system 100 and the subscriber account is activated with the features desired by the customer based on a command signal determined by a the customer data or customer data record.

The customer database 220 is then linked to the vehicle database 210, both in the external telematics database 225, by the vehicle identification number. The linked customer and vehicle data is sent to the communications service manager 174 of the telematics call center 170 as a command signal. All command signals may be transmitted to the telematics call center 170 at the end of the day or periodically during the day or the week. The command signals are transmitted in many ways including one or more wireless carrier systems 140, one or more communication networks 150 and one or more land networks 160.

Upon receipt of the command signal the customer is automatically enrolled in the telematics-unit access system 100 by the communication services manager 174, which populates the account with customer data. Activation of the telematics unit 120 occurs automatically according to the present invention, when a command signal is determined based on the customer data record and the command signal, operable to is sent to the telematics unit 120 of a vehicle 110 to configure the hardware of the telematics unit 120 according to the command signal.

In some embodiments, the telematics unit 120 sends notice to the communications service manager 174 of the telematics call center 170 that the customer wishes to activate the telematics-unit access system 100 of a vehicle 110. In some embodiments, notice that a subscriber is ready to activate the telematics-unit access system 100 is initiated by an action taken at the telematics unit 120, such as, for example, pressing a specified button operable to initiate activation of the subscriber account. When such notice is received, the telematics call center 170 activates the service in the telematics-unit access system 100 with the requested features. Such features include, but are not limited to, navigation assistance, real-time traffic advisories, directory assistance, roadside assistance, business or residential assistance, information services assistance, emergency assistance, and communications assistance, vehicle personalization, vehicle data upload, vehicle data download, unlock/lock vehicle, flash lights, honk horn, perform diagnostic functions, perform vehicle tracking functions or combinations of any or all of the above. The activation process includes transmission of a description of service options to the customer sitting in the vehicle 110 through the telematics unit 120 to provide an introduction of the service to the customer. The activation process also includes transmission of instructions from the telematics call center 170 to the telematics unit 120, which set the hardware of the installed telematics unit 120 to provide the requested service features.

Alternately, if notice is received at the telematics call center 170 that a subscriber is ready to activate the telematics-unit access system 100 of a vehicle 110 prior to receipt of the command signal at the telematics call center 170, the communications services manager 174 of the telematics call center 170 places a request to receive the command signal from the external telematics database 225. If the customer data record has not yet been sent by the vehicle dealership 215, the communications services manager may periodically place a request to receive the command signal from the external telematics database 225 until the data is received. Additionally, the communications services manager 174 will initiate a transmission of a description of service options to the customer sitting in the vehicle 110 through the telematics unit 120.

Figure 3:
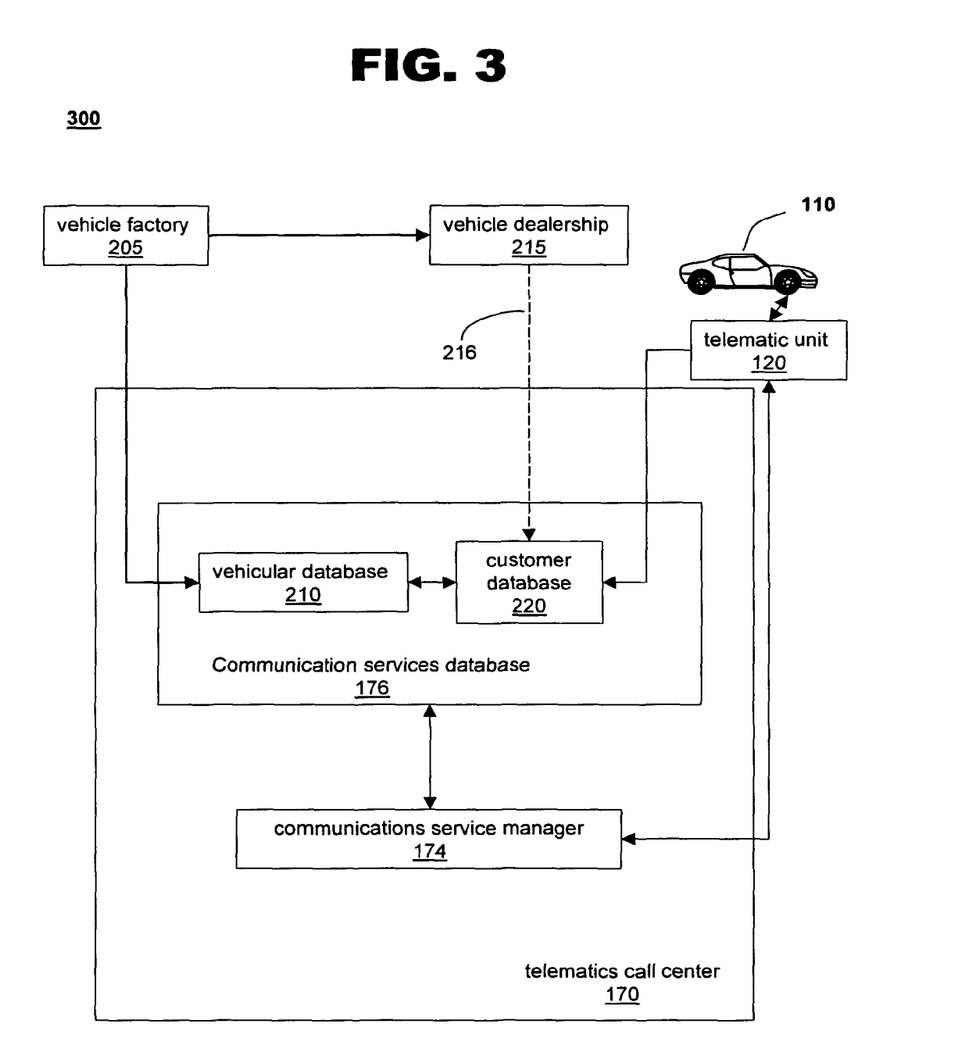
FIG. 3 is a schematic block diagram of a system for providing data to a telematics-unit access system, in accordance with a second embodiment of the present invention.

FIG. 3 is a block diagram of the flow of data 300 required to enroll a subscriber and activate a telematics-unit access system 100 according to another embodiment of the present invention. In this system the vehicular database 210 and the customer database 220 are located in the communication services database 176 of the telematics call center 170 rather than being at a separate location, such as the external telematics database 225 illustrated in FIG. 2. the vehicular database 210 and the customer database 220 are in communication with each other.

As in FIG. 2, the vehicle factory 205 manufactures a vehicle 110 with a telematic unit 120. The vehicle 110 is shipped to vehicle dealership 215 where it is offered for sale to potential customers. Again, the factory 205 also transmits vehicle data to a vehicular database 210, which contains data on a plurality of vehicles with telematic units 120 installed. In system 300, the vehicular database 210 is a portion of the communication services database 176 of the telematics call center 170.

When a customer purchases a vehicle 110 with an installed telematics unit 120, the customer is enrolled as a subscriber in the telematics-unit access system 100 and the subscriber account is activated with the features desired by the customer. The dealer selling the vehicle 110 to the customer, as part of the sales, enters data about the customer in a dealership database (not shown). Some of this customer data is automatically sent to the customer database 220, as illustrated by the dashed arrow 216 connecting the vehicle dealership 215 and the customer database 220. The customer database 220 is located in the communication services database 176 within the telematics call center 170. As in system 200, the customer data may be sent to the customer database 220 at the end of the day or periodically during the day or the week. The customer is enrolled as a subscriber in the telematics-unit access system 100 and the subscriber account is activated with the features desired by the customer based on a command signal determined by a the customer data record or the customer database 220.

The customer database 220 is then linked to the vehicle database 210, both in the communication services database 176, by the vehicle identification number. The linked customer data and vehicle data is transmitted to the communications service manager 174 of the telematics call center 170 as a command signal via one or more bus systems 180 (FIG. 1) within the telematics call center 170.

Upon receipt of the command signal at the communication services manager 174, the customer is automatically enrolled by the communication services manager 174 in the telematics-unit access system 100, which populates the account with customer data. Activation of the telematics unit 120 occurs automatically according to the present invention, when a command signal is determined based on the customer data record and the command signal, operable to is sent to the telematics unit 120 of a vehicle 110 to configure the hardware of the telematics unit 120 according to the command signal.

In some embodiments, the telematics unit 120 sends notice to the communications service manager 174 of the telematics call center 170 that the customer wishes to activate the telematics-unit access system 100 of a vehicle 110. In some embodiments, notice that a subscriber is ready to activate the telematics-unit access system 100 is initiated by an action taken at the telematics unit 120, such as, for example, pressing a specified button operable to initiate communication with the telematics call center 170 in order to activate the telematics-unit access system 100. When such notice is received, the telematics call center 170 generates a command signal based on the customer data record and uses the command signal to activate the subscriber service in the telematics-unit access system 100 with the requested features. Such features include, but are not limited to, navigation assistance, real-time traffic advisories, directory assistance, roadside assistance, business or residential assistance, information services assistance, emergency assistance, and communications assistance, vehicle personalization, vehicle data upload, vehicle data download, unlock/lock vehicle, flash lights, honk horn, perform diagnostic functions, perform vehicle tracking functions or combinations of any or all of the above. The activation process includes transmission of a description of service options to the customer sitting in the vehicle 110 through the telematics unit 120 as an introduction of the service to the customer. The activation process also includes transmission of instructions from the telematics call center 170 to the telematics unit 120, which set the hardware of the installed telematics unit 120 to provide the requested service features.

Alternately, if notice is received at the telematics call center 170 that a subscriber is ready to activate the telematics-unit access system 100 of a vehicle 110 prior to receipt of the command signal by the communication service manager 174, the communications services manager 174 requests input about command signal from the communication services database 176 via one or more bus systems 180 (FIG. 1). If the customer data record has not yet been sent by the vehicle dealership 215, the communications services manager may periodically place a request to receive the command signal from the communication services database 176 until the data is received.

The data flow described in FIGS. 2 and 3 is comprised of one or more vehicular databases 210, one or more customer databases 220, one or more external telematics databases 225, one or more communication services managers 174, one or more communication services databases 176. Databases in the same location are linked by one or more bus systems 180. Databases in remote locations communicate via one or more wireless carrier systems 140, one or more communication networks 150 and one or more land networks 160.

Figure 4:
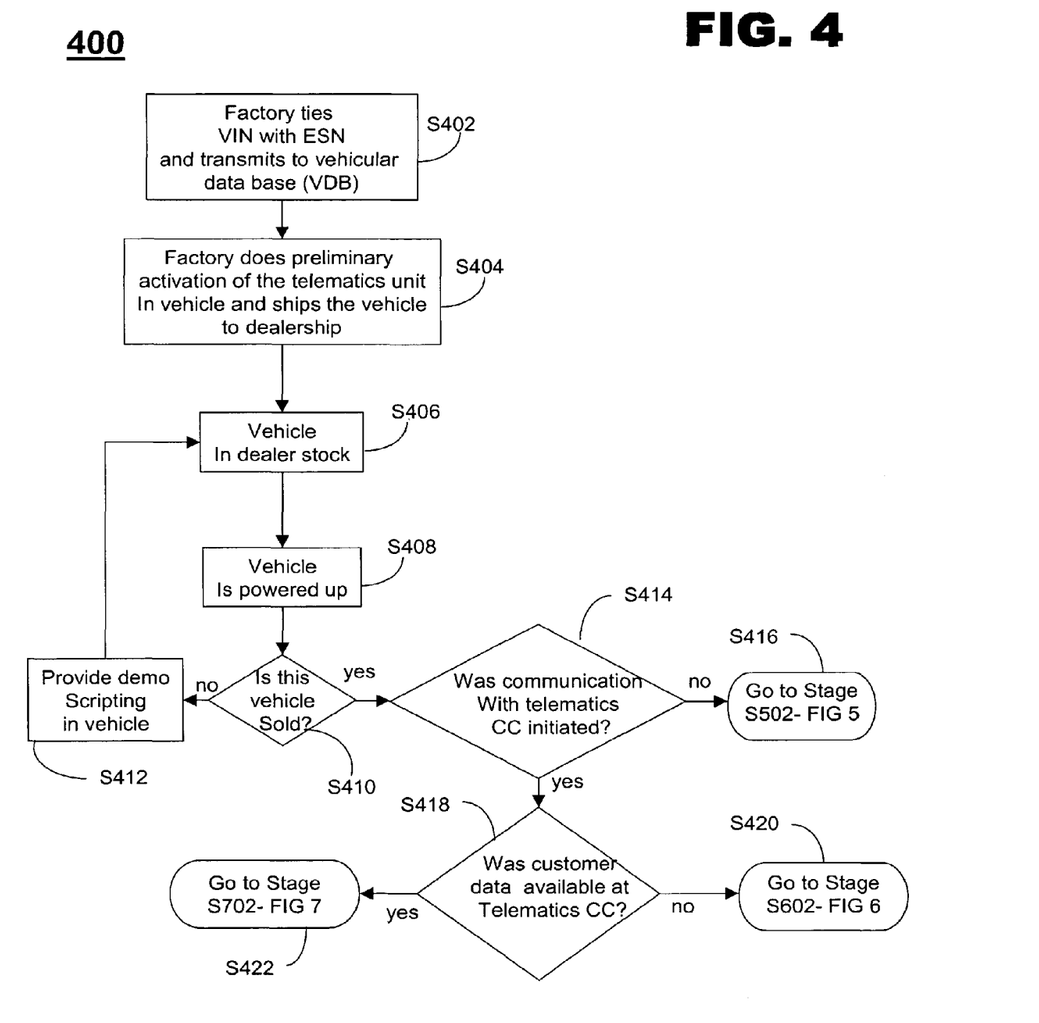
FIG. 4 illustrates a flowchart representative of a first portion of a second embodiment in accordance with the present invention.

FIG. 4 illustrates a flowchart 400 representative of a first portion of an embodiment in accordance with the present invention and will be discussed using FIG. 3 and FIG. 1 as an exemplary system. During stage S402 the vehicle factory 205 ties the vehicle identification number (VIN) with the electronic serial number (ESN) of the cell phone 134 in the telematics unit 120 installed in the vehicle 110 and transmits this data into the vehicular database (VDB) 210. During stage S404 the factory 205 does a preliminary activation of the telematics unit in vehicle 110 and ships vehicle 110 to the vehicle dealership 215. During stage S406 the vehicle 110 is in the dealership 215 stock. The vehicle 110 is available to be taken for a test drive by potential customers by the dealer at this time. During stage S408 the vehicle 110 is powered up. During stage S410 the dealer indicates if the vehicle 110 is sold. Upon an indication from the dealer that the vehicle 110 is not sold, the flow progresses to stage S412. During stage S412, the telematics-unit access system 100 is demonstrated by providing demonstration scripting in vehicle for the potential customer to hear. Then the flow progresses back to stage S406. If the dealer indicates that vehicle 110 has been sold during stage 410, the flow progresses to stage S414. During stage S414 it is determined if a communication with the telematics call center (CC) 170 was initiated by, for example, the press of a button at the telematics unit 120. If it is determined that a communication was not initiated with the telematics call center (CC) 170 the flow proceeds to stage S416. Stage S416 indicates that the flow continues at stage S502 in FIG. 5.

If it is determined that a communication was initiated with the telematics call center (CC) 170 during stage S414, then the flow proceeds to stage S418. During stage S418 it is determined if the customer data is available at the telematics call center (CC) 170. If it is determined the customer data is not available at the telematics call center (CC) 170, the flow proceeds to stage S420. Stage S420 indicates that the flow continues at stage S602 in FIG. 6. If, during stage S418, it is determined the customer data is not available at the telematics call center (CC) 170, the flow proceeds to stage S422. Stage S422 indicates that the flow continues at stage S702 in FIG. 7.

Figure 5:
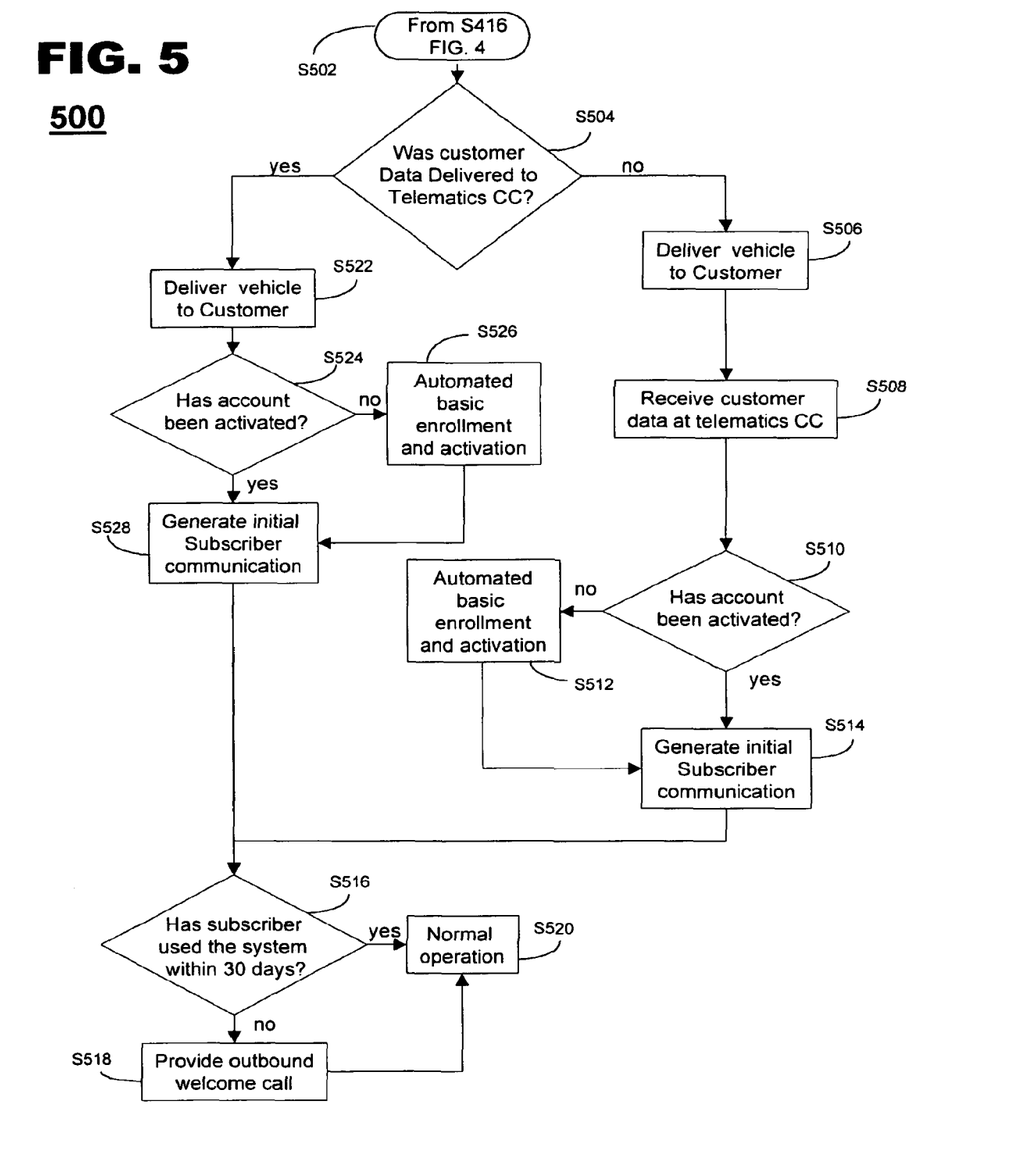
FIG. 5 illustrates a flowchart representative of a second portion of a second embodiment in accordance with the present invention.

FIG. 5 illustrates a flowchart 500 representative of a second portion of an embodiment in accordance with the present invention and will be discussed using FIG. 3 and FIG. 1 as an exemplary system. Stage S502 indicates that FIG. 5 is a continuation of the flow from stage S416 in FIG. 4. During stage S504 it is determined if customer data was delivered to the telematics call center 170. If customer data was not delivered to the telematics call center (CC) 170, then the flow continues to stage S506. During stage S506 the vehicle 110 is delivered to the customer. During stage S508 the customer data is received at the telematics call center (CC) 170. Specifically the communication services database 176 receives the customer data at the customer database 220. In some embodiments of the present invention, some or all of the customer data, which forms the command signal, is received at the customer database 220 from the vehicle dealership 215. Additionally, in some embodiments of the present invention, some or all of the customer data, which forms the command signal, is received from the telematics unit 120 at the telematics call center 170 and input to the communication services database 176 where it is stored in the customer database 220. This information may be received in many ways including, but not limited to, enrollment on the Internet (not illustrated), the customer delivery record, illustrated as a dashed line 216 from the vehicle dealership 215 to the customer database 220 in FIG. 3, a telephone call to the telematics call center 170 (not illustrated) or an initiating communication at the telematics unit 120 by the dealer or the customer.

During stage S510 it is determined if the account has been activated. If the account has been activated the flow proceeds to stage S514. During stage S514 an initial subscriber communication for the new subscriber is generated by the telematics-unit access system 100. This includes, in a preferred embodiment, mailing a package of information to the subscriber to inform the subscriber about the telematics-unit access system 100.

During stage S516 it is determined if the subscriber has used the telematics-unit access system 100 during the first 30 days of service. If it is determined that the subscriber has never used the telematics-unit access system 100 in the first 30 days of service, the flow proceeds to stage S518. During stage S518 a welcome call is provided to the new subscriber when the vehicle 110 is turned on and the customer is in the vehicle 110. This is to educate the new subscriber about the system options, in case they are unfamiliar with the telematics-unit access system 100 or uncertain about how to use the telematics-unit access system 100. During stage S520 normal operation begins.

If, during stage S516, it is determined that the subscriber has used the telematics-unit access system 100 in the first 30 days of service, the flow proceeds to stage S520 and normal operation begins.

If, during stage S510, it is determined that the account has not been activated the flow proceeds to stage S512. During stage S512 a basic enrollment of the customer automatically occurs and the system is activated with the basic service by a transmission of instructions from the telematics call center 170 to the telematics unit 120, which configure the hardware of the installed telematics unit 120 to provide the automated basic service features. Basic service features will, in one embodiment, include only a few of the multiple options available to the subscriber. Then the flow proceeds to stage S514. During stage S514 an initial subscriber communication for the new subscriber is generated by the telematics-unit access system 100. This includes, in a preferred embodiment, mailing a package of information to the subscriber to inform the subscriber about the telematics-unit access system 100. The flow then proceeds to S516 and the remainder of the flow chart as discussed above.

If during stage S504 it is determined that customer data was delivered to the telematics call center 170, the flow continues to stage S522. During stage S522 the vehicle 110 is delivered to the customer.

During stage S524 it is determined if the account has been activated. If the account has been activated the flow proceeds to stage S528. During stage S528 an initial subscriber communication for the new subscriber is generated by the telematics-unit access system 100. This includes, in a preferred embodiment, mailing a packing of information to the subscriber to inform the subscriber about the telematics-unit access system 100. The flow then proceeds to S516 and the remainder of the flow chart as discussed above.

If, during stage S524, it is determined that the account has not been activated the flow proceeds to stage S526. During stage S526 a basic enrollment of the customer automatically occurs and the system is activated with the basic service by a transmission of instructions from the telematics call center 170 to the telematics unit 120, which configure the hardware of the installed telematics unit 120 to provide the automated basic service features. Basic service features will, in one embodiment, include only a few of the multiple options available to the subscriber. Then the flow proceeds to stage S528. During stage S528 an initial subscriber communication for the new subscriber is generated by the telematics-unit access system 100. This includes, in a preferred embodiment, mailing a package of information to the subscriber to inform the subscriber about the telematics-unit access system 100. The flow then proceeds to S516 and the remainder of the flow chart as discussed above.

All possible flows for FIG. 5 have now been described. At any point during this flow the customer has the option to modify the services which are provided by the automatic basis enrollment.

Figure 6:
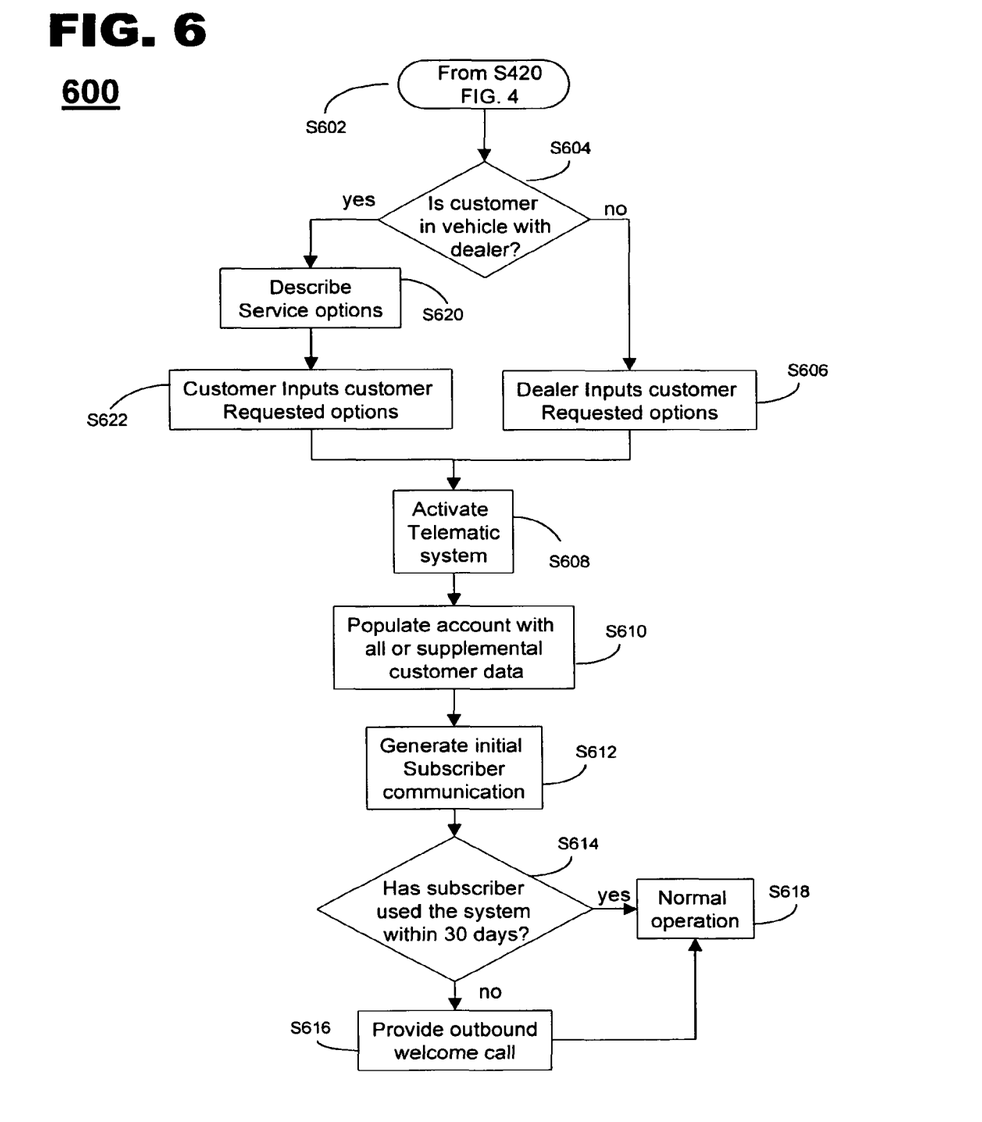
FIG. 6 illustrates a flowchart representative of a third portion of a second embodiment in accordance with the present invention.

FIG. 6 illustrates a flowchart 600 representative of a third portion of an embodiment in accordance with the present invention and will be discussed using FIG. 3 and FIG. 1 as an exemplary system. Stage S602 indicates that FIG. 6 is a continuation of the flow from stage S420 in FIG. 4. During stage S604 it is determined if the customer is in the vehicle 110 with the dealer who sold the car. If it is determined that the customer is not with the dealer in the vehicle 110, the flow proceeds to stage S606. During stage S606 the dealer inputs the customer requested options for service in the telematics-unit access system 100. The flow then proceeds to stage S608.

If during stage S604 it is determined that the customer is in the car with the dealer the flow proceeds to stage S620. During stage S620 the customer receives a description of the service options via the telematics unit 120 in the vehicle 110. During stage S622 the customer inputs their name zip code and the desired service options via the telematics unit 120. The desired options for access to the telematics-unit access system 100 are, in some embodiments, dependent upon the zip code of the customer, since all the features may not be available in all geographical areas.

After stages S606 and S622, the flow proceeds to stage S608. During stage S608 the telematics-unit access system 100 is activated for the subscriber by a transmission of instructions from the telematics call center 170 to the telematics unit 120, which set the hardware of the installed telematics unit 120 to provide the requested service features. During stage S610 the account is populated with all or supplemental customer data. The customer data may include, but is not limited to, the customer name, address, phone number, selling dealer and vehicle identification number of the purchased vehicle 110.

Then the flow proceeds to stage S612. During stage S612 an initial subscriber communication for the new subscriber is generated by the telematics-unit access system 100. This includes, in a preferred embodiment, mailing a package of information to the subscriber to inform the subscriber about the telematics-unit access system 100.

During stage S614 it is determined if the subscriber has used the telematics-unit access system 100 during the first 30 days of service. If it is determined that the subscriber has never used the telematics-unit access system 100 in the first 30 days of service, the flow proceeds to stage S616. During stage S616 a welcome call is provided to the new subscriber when the vehicle 110 is turned on and the customer is in the vehicle 110. This is to educate the new subscriber about the system options, in case they are unfamiliar with the telematics-unit access system 100 or uncertain about how to use the telematics-unit access system 100. During stage S618 normal operation begins.

If, during stage S614, it is determined that the subscriber has used the telematics-unit access system 100 in the first 30 days of service, the flow proceeds to stage S618 and normal operation begins.

Figure 7:
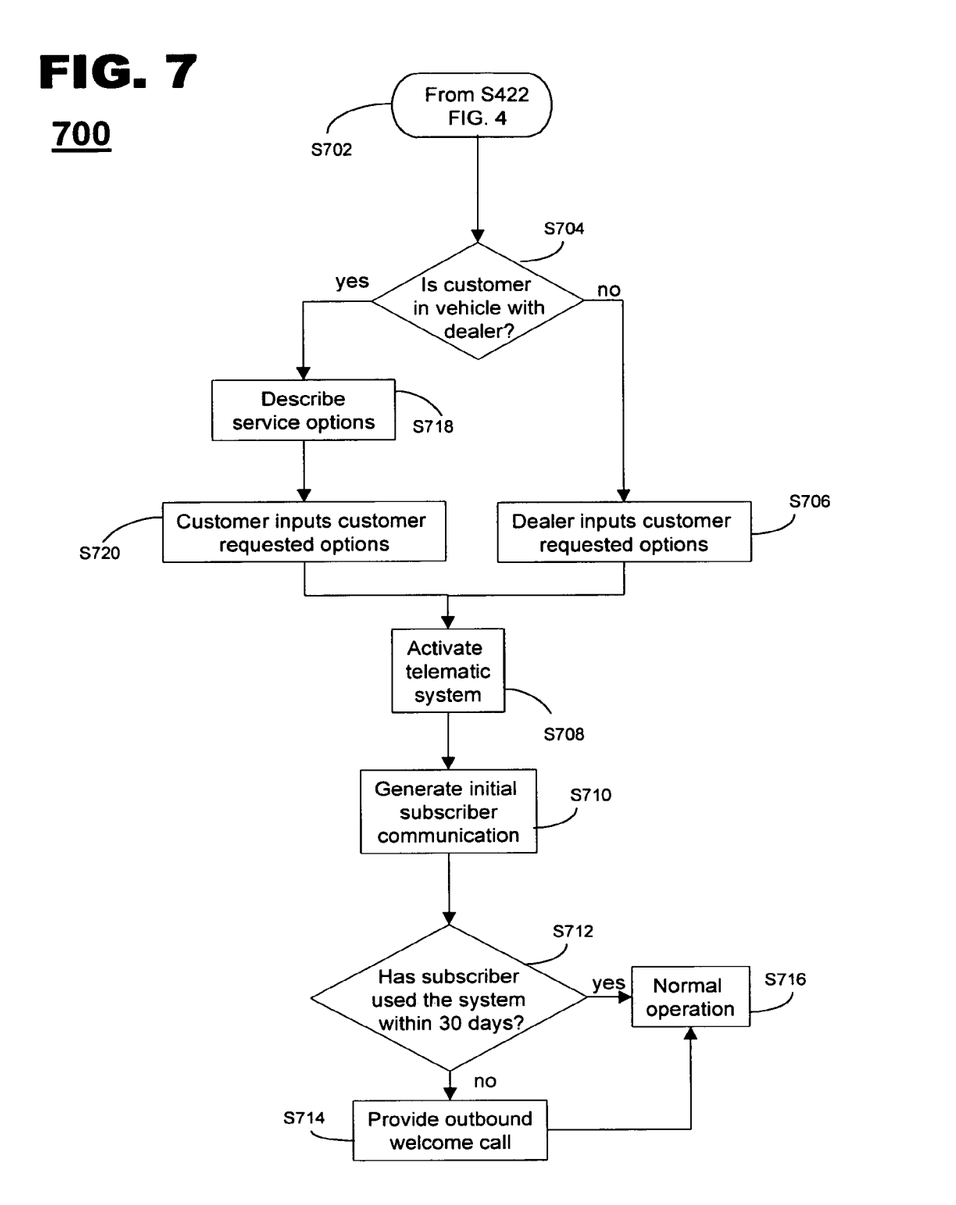
FIG. 7 illustrates a flowchart representative of a fourth portion of a second embodiment in accordance with the present invention.

FIG. 7 illustrates a flowchart 700 representative of a forth portion of an embodiment in accordance with the present invention and will be discussed using FIG. 3 and FIG. 1 as an exemplary system. Stage S702 indicates that FIG. 7 is a continuation of the flow from stage S422 in FIG. 4. The flowchart 700 of FIG. 7 is identical to the flowchart 600 of FIG. 6 except that a stage S610 is not included since all required customer data was determined to be available during stage S418 of FIG. 4.

During stage S704 it is determined if the customer is in the vehicle 110 with the dealer who sold the car. If it is determined that the customer is not with the dealer in the vehicle 110, the flow proceeds to stage S706. During stage S706 the dealer inputs the customer requested options for service in the telematics-unit access system 100. The flow then proceeds to stage S608.

If during stage S704 it is determined that the customer is in the car with dealer the flow proceeds to stage S718. During stage S718 the customer receives a description of the service options via the telematics unit 120 in the vehicle 110. During stage S720 the customer inputs their name zip code and the desired service options via the telematics unit 120. The desired options for access to the telematics-unit access system 100 are, in some embodiments, dependent upon the zip code of the customer, since all the features may not be available in all geographical areas.

After stages S706 and S720, the flow proceeds to stage S708. During stage S708 the telematics-unit access system 100 is activated for the subscriber by a transmission of instructions from the telematics call center 170 to the telematics unit 120, which set the hardware of the installed telematics unit 120 to provide the requested service features.

Then the flow proceeds to stage S710. During stage S710 an initial subscriber communication for the new subscriber is generated by the telematics-unit access system 100. This includes, in a preferred embodiment, mailing a package of information to the subscriber to inform the subscriber about the telematics-unit access system 100.

During stage S712 it is determined if the subscriber has used the telematics-unit access system 100 during the first 30 days of service. If it is determined that the subscriber has never used the telematics-unit access system 100 in the first 30 days of service, the flow proceeds to stage S714. During stage S714 a welcome call is provided to the new subscriber when the vehicle 110 is turned on and the customer is in the vehicle 110. This is to educate the new subscriber about the system options, in case they are unfamiliar with the telematics-unit access system 100 or uncertain about how to use the telematics-unit access system 100. During stage S618 normal operation begins.

If, during stage S712, it is determined that the subscriber has used the telematics-unit access system 100 in the first 30 days of service, the flow proceeds to stage S716 and normal operation begins.

By the embodiments described herein, the enrollment and activation process is automated reducing enrollment costs, improving the relationship between the telematic system provider and the dealership, and improving the quality of customer data.

The automated enrollment and activation process described in FIG. 2 to FIG. 7 will automatically determine if a vehicle 110 is in an extended telematic service area and configure the telematics unit 120 in the vehicle 110 appropriately. If the vehicle factory 205 does not supply the required vehicle data to the vehicular database 210, the traditional enrollment process is available. Other aspects of the invention include determining if an incoming call is the first call from a newly activated telematics unit 120 and minimizing the data collected from the dealer or subscriber via land line telephone, cell phone or the telematics unit 120, since the extended data is available from the customer data record.

The automated enrollment and activation process supports web pre-enrollment by allowing reception of web-specific data fields and will report exceptions and failures to the automated enrollment process for attention and resolution. In some embodiments of the present invention, the automated enrollment and activation process has defaults such as assigning the customer on the customer database 220 as the primary driver in the account, unless otherwise noted, and selecting the subscription package with a 12 month duration, if there is more than one subscription package option from which to choose.

While the embodiments of the invention disclosed herein are presently preferred, various changes and modifications may be made without departing from the spirit and scope of the invention. The scope of the invention is indicated in the appended claims, and all changes that come within the meaning and range of equivalents are intended to be embraced therein.

The invention claimed is:

1. A method for processing a vehicle that has been initially sold or leased after a dealer received the vehicle from a vehicle factory, comprising the steps:
 (a) receiving customer-related data from a vehicle sales facility at one or more database(s), wherein the customer-related data is electronically sent from the vehicle sales facility and is received in response to the initial sale or lease of the vehicle to a customer;
 (b) producing a first command signal using at least in part the customer-related data;
 (c) electronically sending the first command signal to a computer-based communications service manager;
 (d) automatically enrolling the customer in a telematics unit access system in response to receipt of the first command signal by the computer-based communications services manager;
 (e) producing a second command signal using at least in part the customer-related data received from the vehicle sales facility; and
 (f) sending the second command signal to a telematics unit of the vehicle, wherein receipt of the second command signal causes the telematics unit to become activated by configuring hardware of the telematics unit as part of a telematics unit access system enrollment.

2. The method of claim 1, wherein the customer-related data includes at least one piece of data selected from the group consisting of: a customer name, a customer address, a customer phone number, a name of a vehicle sales facility, one or more feature(s) desired by a customer, and a vehicle identification number (VIN).

3. The method of claim 1, wherein:
 step (a) further comprises receiving vehicle-related data from a vehicle manufacturing facility at the one or more database(s);
 step (e) further comprises producing the second command signal using both the vehicle-related data and the customer-related data.

4. The method of claim 3, wherein step (a) further comprises receiving the vehicle-related data in response to shipping the vehicle from the vehicle manufacturing facility to the vehicle sales facility.

5. The method of claim 3, wherein the vehicle-related data includes at least one piece of data selected from the group consisting of: a vehicle identification number (VIN), an electronic serial number (ESN), a name of a vehicle sales facility, and a location of a vehicle sales facility.

6. The method of claim 3, wherein the customer-related data includes one or more feature(s) desired by the customer, and the receipt of the second command signal in step (f) causes the telematics unit to become activated with the desired feature(s).

7. The method of claim 6, wherein the desired feature(s) include at least one feature selected from the group consisting of: navigation assistance, real-time traffic, directory assistance, roadside assistance, information services assistance, emergency assistance, communications assistance, vehicle personalization, vehicle data upload, vehicle data download, door unlock/lock, diagnostic functions, and vehicle tracking functions.

8. The method of claim 3, further comprising the step:
(d) linking the vehicle-related data with the customer-related data by using a vehicle identification number (VIN).

9. The method of claim 3, wherein prior to step (c), receiving a signal indicating that the customer wishes to proceed with the activation process.

10. A method for processing a vehicle that has been initially sold or leased after a dealer received the vehicle from a vehicle factory, comprising the steps:
(a) determining one or more feature(s) that are desired by the customer;
(b) electronically sending a customer delivery report to a database, wherein the customer delivery report includes the feature(s) desired by the customer;
(c) configuring a command signal to activate a telematics unit of the vehicle with the feature(s) desired by the customer; and
(d) electronically sending the command signal to the telematics unit, wherein receipt of the command signal causes the telematics unit to become activated by configuring hardware of the telematics unit as part of a telematics unit access system enrollment with the feature(s) desired by the customer.

11. The method of claim 10, wherein the method includes, prior to step (a), the step of sending vehicle-related data from a vehicle manufacturing facility to one or more database(s) in response to shipping the vehicle from the vehicle manufacturing facility to a vehicle sales facility.

12. The method of claim 11, wherein the vehicle-related data includes at least one piece of data selected from the group consisting of: a vehicle identification number (VIN), an electronic serial number (ESN), a name of a vehicle sales facility, and a location of a vehicle sales facility.

13. The method of claim 10, wherein the method includes, prior to step (a), the step of sending customer-related data from a vehicle sales facility to one or more database(s) in response to a recent sale or lease of the vehicle.

14. The method of claim 13, wherein the customer-related data includes at least one piece of data selected from the group consisting of: a customer name, a customer address, a customer phone number, a name of a vehicle sales facility, one or more feature(s) desired by a customer, and a vehicle identification number (VIN).

15. The method of claim 10, wherein the method includes, prior to step (d), the step of receiving a signal indicating that the customer wishes to proceed with the activation process.

16. The method of claim 10, wherein the desired feature(s) include at least one feature selected from the group consisting of: navigation assistance, real-time traffic, directory assistance, roadside assistance, information services assistance, emergency assistance, communications assistance, vehicle personalization, vehicle data upload, vehicle data download, door unlock/lock, diagnostic functions, and vehicle tracking functions.

* * * * *